United States Patent [19]

Dodson, III

[11] 3,892,950

[45] July 1, 1975

[54] AVERAGE VALUE CROSSOVER DETECTOR

[75] Inventor: George Bertram Dodson, III, Shirley, Mass.

[73] Assignee: RCA Corporation, New York, N.Y.

[22] Filed: Apr. 22, 1974

[21] Appl. No.: 462,770

[52] U.S. Cl. .......................... 235/61.11 E; 250/566

[51] Int. Cl. .......................... G06k 7/10; G08c 9/06

[58] Field of Search .............. 235/61.11 E, 61.11 D; 250/555, 566; 340/146.3 K; 360/39, 40, 41, 42, 33; 329/142; 307/231, 236

[56] References Cited

UNITED STATES PATENTS 3,751,636 8/1973 Coles, Jr. .................... 235/61.11 E

*Primary Examiner*—Daryl W. Cook

*Attorney, Agent, or Firm*—E. J. Norton; R. E. Smiley

[57] ABSTRACT

A circuit for detecting transitions in an alternating signal representing binary information which signal may lack uniform peaks and sharp transitions. The signal is impressed simultaneously on a delay line and a rate of change circuit. A given fraction of the sum of the delayed and undelayed alternating signal is stored in a sample and hold circuit under control of a signal from the rate of change detector. The sample and hold signal and the delayed signal are impressed on a comparator circuit, the output of which is indicative of the binary value of the alternating signal at any given time.

15 Claims, 3 Drawing Figures

AVERAGE VALUE CROSSOVER DETECTOR

BACKGROUND OF THE INVENTION

It is often important in signal processing applications to detect when an alternating signal changes from a value on one side of its instantaneous direct current component to the other. If the alternating signal is symmetrical about a constant amplitude base line such as ground, the circuits for accomplishing this objective are simple. However, when the alternating signal is asymmetrical, the direct current component of the signal varies in amplitude. In this situation, the problem of determining when the signal crosses its instantaneous average level (termed here the "signal transition time") is more difficult to solve. Such a problem may occur with apparatus used to optically scan labels having alternating regions, along the scan path, exhibiting two different reflectivities such as black and white. It is desired to know when the scanning apparatus passes from a scan across a region of one reflectivity to that of another. If such a transition was manifested by a sharp change in signal level from the scanning apparatus, there would be no problem. However, since the scanning apparatus scans at any one time a finite region, it will, at a transition time, be scanning an area containing both a black region and an adjoining white region so that a sharp transition signal is not produced by the scanning apparatus. Still, it would not be difficult to determine when a transition occurred if the white and black regions produced uniform reflectivity. Then it would only be necessary to set a fixed threshold level. Scan signal levels on one side of the threshold would be considered white by definition, while scan signal levels on the other side of such a threshold would be considered black. Where, however, the white regions may not be pure white or the black regions pure black, a fixed threshold system will not be suitable. One solution to this latter problem is described in U.S. Pat. No. 3,751,636, issued to Herbert George Coles, Jr., and assigned to the same assignee as the present invention.

SUMMARY OF THE INVENTION

A delayed and undelayed alternating signal are impressed on a means for producing an output signal equal to a fraction of the sum of the two input signals. The output signal is stored in a storage means conditioned to accept data by a signal from a means responsive to the absence of transitions in both the delayed and undelayed signals. The delayed alternating signal and stored signal are impressed on a comparator which produces one of two signals, depending on which of the two input signals has the greater amplitude.

DETAILED DESCRIPTION

Figure 1:
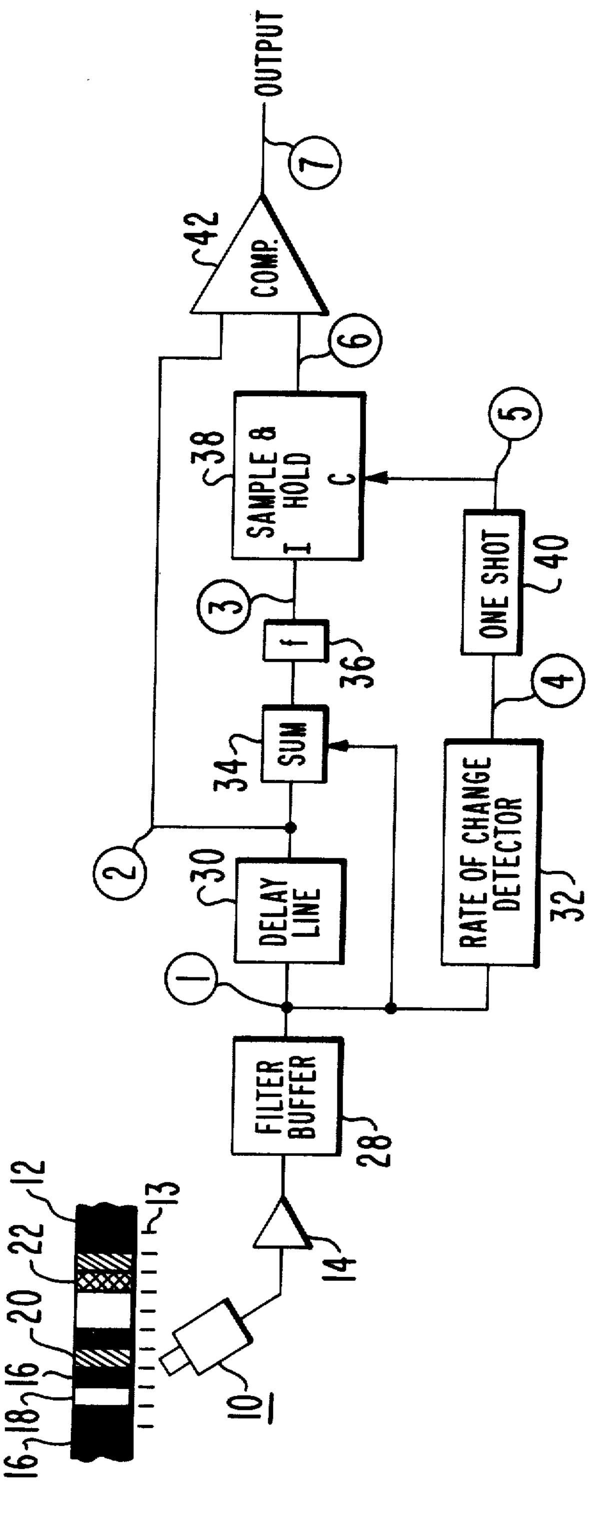
FIG. 1 is a block and schematic drawing of a signal transition detection circuit according to one embodiment of the invention.

Optical scanner 10, FIG. 1, is adapted to serially scan at a constant rate a binary pattern such as 12. This pattern may be an optical pattern on a medium such as paper or some other recording material. The scanner produces electrical signals, which are amplified by an amplifier 14, and which represent the reflectance of the portion of the medium being scanned. A typical scanner of this kind is illustrated and discussed in U.S. Pat. No. 3,622,758, issued to J. Schanne, and assigned to the same assignee as the present invention. Scanner 10, as described herein, is only a schematic representation.

The binary pattern 12 ideally is in only two colors such as black 16 and white 18, exhibiting two different levels of reflectivity. Each area is some integral multiple (including 1) of a unit width along the path scanned by scanner 10. One unit width represents one bit. The tic lines 13 mark the boundaries between adjacent bits. At the constant rate at which the scanner 10 operates, the time required to scan the area of unit width is a known value chosen to be 800 nanoseconds (ns) in one working embodiment.

In practice, the pattern does not meet the ideal discussed above. Some areas 20 illustrated with diagonal lines may be soiled or smudged and exhibit less reflectivity than pure white areas 18. Other areas (one is shown at 22 as a cross-hatched pattern) may be misprinted, for example, so that they are lighter than the pure black areas 16 and therefore, exhibit a somewhat higher reflectivity than the theoretical zero reflectivity of a pure black area. Further, as the scanner 10 scans an area of finite width, the area being scanned at any instant in time may be one which includes regions of more than one level of reflectivity. Thus, data signal 1 (FIG. 2) produced by amplifier 14 as the scanner scans the binary pattern 12, rather than being a steep-sided two level signal, exhibits a finite transition time from one level to another and is asymmetrical, varying peak-to-peak between several different levels.

The output terminal of amplifier 14 is coupled to a filter buffer 28. Filter 28 is conditioned to eliminate noise, particularly signals in frequencies much above the data signal input. The output terminal of filter 28 is coupled both to a delay means, such as a delay line 30, and to rate of change detector circuit 32. The delay in delay line 30 is any time longer than the maximum expected rise (or fall) time of the filtered input signal, but not longer than the spacing between transitions of the input signal. A delay of 600 ns is used for illustrative purposes in the description which shortly follows. The rate of change detector produces a pulse during the time of transition, either positive or negative, of the input signal. The output terminals of delay line 30 and of filter 28 are coupled to a summing circuit 34, which produces a signal equal to the instantaneous sum of the delayed and undelayed data signal. The output terminal of summing circuit 34 is coupled to a fraction circuit 36, which may typically produce a signal at its output terminal equal to ½ the signal at its input terminal.

The output terminal of fraction circuit 36 is coupled to the input terminal of a sample and hold circuit 38. The output terminal of rate of change detector 32 is coupled to a one-shot circuit 40. The output terminal of one-shot 40 is coupled to the control (C) terminal of sample and hold circuit 38.

One-shot 40 is triggered by the trailing edge of each pulse from circuit 32, indicating the end of a transition. The parameters of the one shot are such that its pulse ends before the transition in the data signal has propagated through delay line 30. Thus, the sample and hold circuit is conditioned to accept an input from the fraction circuit only when no transition is taking place from that signal.

The output terminal of the sample and hold terminal 38 is coupled to one input of a comparator 42. The output terminal of delay line 30 is coupled to the other input terminal of comparator 42. The comparator circuit produces a signal in binary form having one value when the signal from delay line 30 is relatively lower in value and having a second value when the signal from sample and hold circuit 38 is of the relatively lower value.

Figure 2:
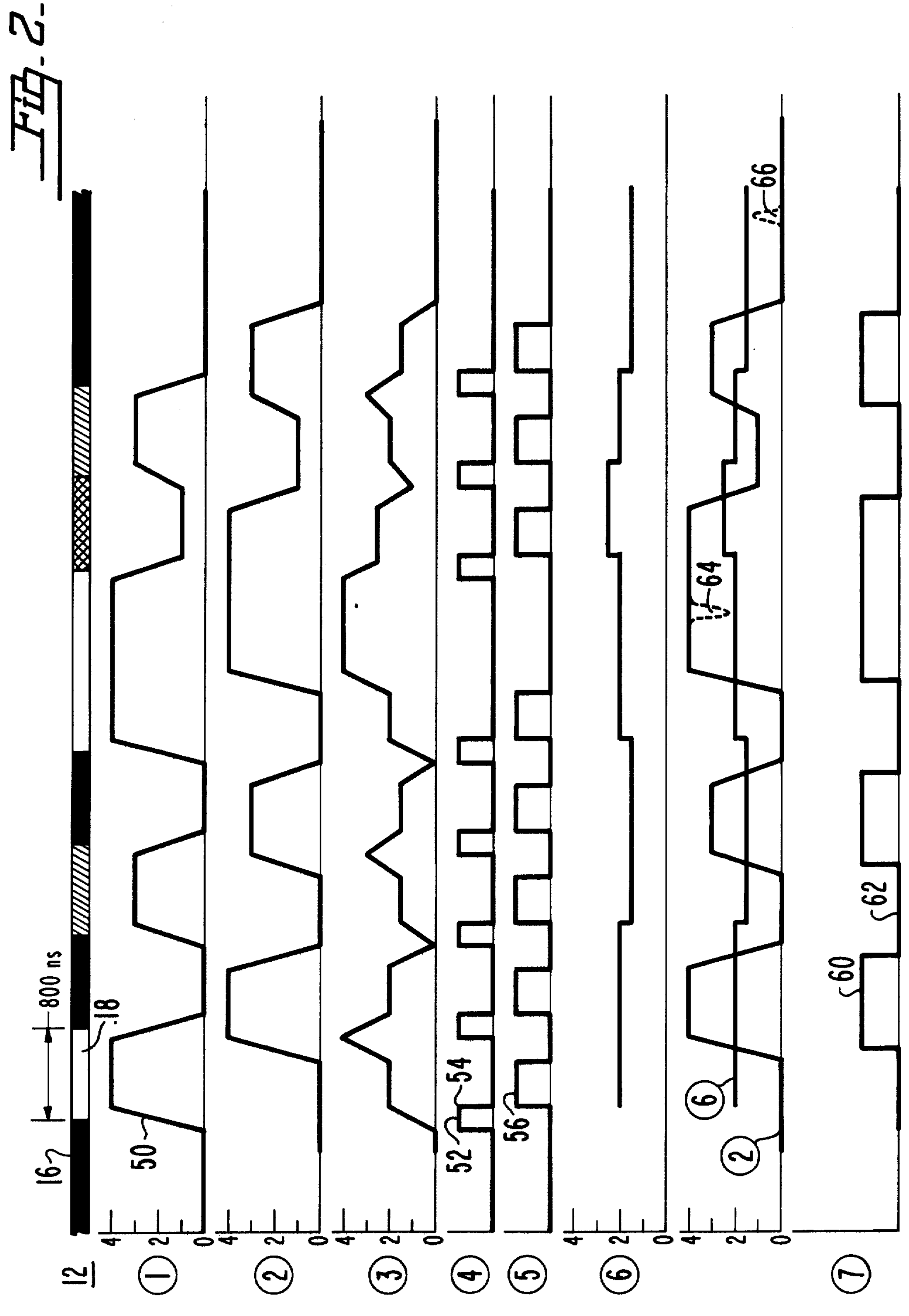
FIG. 2 is a series of waveforms useful for understanding the circuit of FIG. 1

Operation of the circuit of FIG. 1 is best understood by referring to the waveform diagram of FIG. 2. The various waveforms are identified by encircled numbers which correspond to encircled numbers appearing at various points in the system of FIG. 1.

Scanner 10 is caused to scan across the bit pattern 12 at a constant rate of 800 ns per bit. The pattern scanned is shown in both FIGS. 1 and 2 for convenience.

As illustrated in FIGS. 1 and 2, the scanner first scans across a black area 16 of data 12, which causes amplifier 14, and therefore, filter 28, to produce a given constant voltage illustrated in FIG. 2, waveform 1, as zero volts (the voltage values illustrated in FIG. 2 are merely for illustrative purposes). As scanner 10 continues to scan to the right it soon begins to image both the white area 18 as well as the black area 16, causing the signal from filter 28 to rise from a relatively low value (zero volts) to a relatively high value (4 volts) as illustrated in waveform 1 by reference numeral 50. As the scan continues across data 12, the scanner reception beam soon is entirely within the all white region 18, and filter 28 is producing four volts. It should be noted that the value of four volts is merely for convenience in describing the operation of the embodiment of FIG. 1.

All signals from filter 28 will, after the delay caused by delay line 30, appear at the output terminal of the delay line 30. As illustrated in waveform 2, FIG. 2, the signals appear after a delay of 600 ns unaltered except for the delay. Summer 34 and fraction circuit 36 are continuously operative to produce the signal illustrated in waveform 3, a signal which is ½ the sum (assuming a fraction of ½ to be chosen) of waveform 1 before and after the delay.

Returning for a moment to the portion of waveform 1 having reference numeral 50, the change in voltage will be detected by rate-of-change detector 32, which produces a pulse so long as a transition (either positive or negative) is occurring in waveform 1. See waveform 4, pulse 52. At the trailing edge 54 of the pulse 52, one-shot 40 is triggered to produce pulse 56, waveform 5. This pulse enables sample and hold circuit 38 to receive signals from fraction circuit 36. As a result of the enabling signal, sample and hold circuit 38 will be storing a value which is ½ the value of the alternating signal before and after transition 50 or $0 + 4/2 = 2$ volts. As mentioned previously, the timing of pulses from one-shot 40 is such that they cease before transitions in voltage, such as transition 50, waveform 1, propagate through delay line 30. Therefore, when comparator 42 compares the stored waveform in sample and hold circuit 38 with the delayed waveform as illustrated in superimposed waveforms 2 and 6 (penultimate waveform FIG. 2), it is comparing the average voltage before and after a transition with the dynamically changing waveform and will always detect the halfway point. In the case of the example waveform, the average value is 2 volts; therefore, when the delayed waveform passes above 2 volts, the output of comparator 42 includes an indication that a transition has taken place. The output of comparator 42, which represents the data in binary form, is illustrated as waveform 7, FIG. 2.

Referring to waveform 7, a relatively positive signal such as 60 corresponds to a white or nearly white region of data 12, while a relatively negative signal such as 62 corresponds to a black or nearly black region of data 12. The pulses from comparator 42 are delayed in time from the time of the actual scan of the data by the amount of delay in delay line 30, in the illustrated example 600 ns. The delay causes no problem, however, as other logic circuitry, such as described in the aforementioned patent to Schanne, is coupled to delay 42.

The reader may easily follow the waveforms illustrated in FIG. 2 to observe that the circuit will always detect the halfway point in a transition in data signal. This is true regardless of the voltage corresponding to a white region and the voltage corresponding to a black region of data over which the scanner is scanning. The signal at comparator 42, denotes the time of crossing the average data signal value delayed, of course, by 600 ns.

In the circuit described above, the signal from delay line 30 and the undelayed signal from filter 28, may first each be divided by 2, then summed in a summer 34, or may first be summed and then divided, as illustrated in FIG. 1. The important point is that the average value of waveform 1 be stored in sample and hold circuit 38 when the transitional portion of the data signal exits delay line 30.

The voltage fraction selected in circuit 36 (i.e. ½) could be set as some other value, if desired. Some scanner apparatus tested in conjunction with the described device caused the black signals to appear wider than they in fact were. As the scanner begins to scan from a black region 16 to an adjacent region 18, the scanner still produces a signal indicating passage over a black region causing the transition of waveform 1 to occur later than it should. Similarly, white to black transitions would occur too early. By decreasing the voltage fraction to less than ½ (e.g. 0.4), the transitions (i.e. crossover of waveforms 2 and 6) will occur earlier in black to white transitions and later in white to black transitions, thereby compensating for the scanning apparatus. Regardless of the fraction chosen, the combination of summer 34 and fraction circuit 36 may still be considered to be producing the average value of the delayed and undelayed signals. Clearly, the various times stated for scanning and for the delay in delay line 30 and in the one-shot are illustrative only, actual numbers being dictated by the shape and timing of waveform 1.

Figure 3:
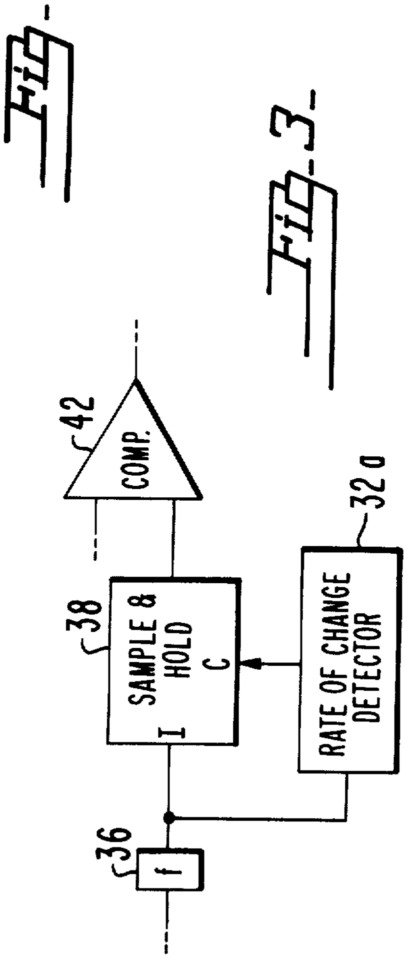
FIG. 3 illustrates a further embodiment of a portion of the circuit in FIG. 1.

As an alternate to the circuit of FIG. 1, rate of change detector 32, FIG. 3, may be employed to monitor waveform 3. Then the output terminal of the detector 32a is coupled to the C terminal of sample and hold circuit 38. With this arrangement rate of change detector 32 and one-shot 40 are not needed. The polarity of the output signal from detector **32*a* is then such that waveform 3 is gated into sample and hold circuit only when and always when there is no change in the signal level. This arrangement works well if there is no noise on the signal from filter buffer 28 (i.e. waveform 1). However, since waveform 6 will rise to the level of waveform 2, while scanning a multibit white region of the label or fall to the level of waveform 2 while scanning a multibit black region of the label, a slight noise on waveform 2 at such locations may cause an undesired crossing of waveforms 2 and 6 with an undesired output from comparator 42. If the expected noise is slight, the upper and lower limits of signal which sample and hold circuit 38 may store may be set to prevent noise problems. If the noise is severe, the alternate arrangement will not function properly. However, the illustrated circuit will work with large noise spikes such as 64 and 66 (shown in phantom FIG. 2), which may have an amplitude almost half the difference in signal level between a white and black label area of waveform 1 or 2. To avoid confusion in the waveforms the noise spikes are shown only on the waveform 2 superimposed on waveform 6. In fact it would of course also appear in waveforms 1 and 3**.

What is claimed is:

1. In combination:

delay means responsive to an alternating input signal for delaying said signal;

means producing a signal equal to the average value of the delayed and undelayed alternating signal;

means storing said average value signal when it is at a fixed value, and comparator means responsive to the signals produced by the delay means and storing means for producing a signal at a first level when the amplitude of the delay means signal exceeds that of the other signal and for producing a signal at a second, different level when the inverse is true.

2. The combination as set forth in claim 1, wherein the transitions of said alternating signal occur at integral multiples of some value X, and wherein said delay means comprises means for delaying said signal by an amount at least equal to the time required for said alternating signal to transition from one value to another, but not greater than X.

3. The combination as set forth in claim 1, wherein said means storing said average value signal includes means responsive to said alternating signal for producing a unique pulse when said alternating signal is at a fixed value, and includes one shot signal producing means responsive to the leading edge of said unique pulse for producing a pulse having a terminal point not greater than the time required for a transition in said alternating signal to pass through said delay means, and includes sample and hold means responsive to said pulse from said one-shot for storing said average value signal.

4. The combination as set forth in claim 1, wherein said means for producing an average value signal includes means for summing said delayed and undelayed signal and includes means responsive to said summed signal for producing a signal which is a fraction of the sum.

5. The combination as set forth in claim 4, wherein said means producing a fraction of said summed signal produces a signal which is one-half of the sum.

6. In combination:

means producing an alternating signal, the peaks of which may be of non-uniform amplitude;

means responsive to said alternating signal for delaying the same;

means responsive to said delayed and undelayed alternating signal for producing a signal which is a fraction of the sum of said signals;

means responsive to said fraction signal for storing the same when said fraction signal is of fixed value;

comparator means responsive to said stored signal and to said delayed signal for producing a signal at a first level when the amplitude of the delay means signal exceeds that of the other signal, and for producing a signal at a second different level when the inverse is true.

7. An arrangement for detecting the times at which an asymmetrical alternating signal changes from a value on one side of a variable threshold level to a value on the other side of this threshold level, where the threshold level is dependent on the varying peak amplitudes of the alternating signal comprising, in combination;

means delaying said alternating signal;

means responsive to said delayed and undelayed alternating signal for producing a signal having the average value of said signals;

means for storing said average value signal produced for a given time interval following the trailing edge of each transition in the alternating signal;

means receptive of the delayed alternating signal and stored signal for producing an output signal each time the amplitude level of one of the signals crosses that of the other.

8. The combination as set forth in claim 7, wherein said storing means comprises means responsive to said alternating signal for producing a unique pulse following the end of each transition in said alternating signal, and comprises means responsive to the leading edge of said unique pulse for producing a signal of fixed duration, not in excess of the time required for the alternating signal causing said unique pulse to propagate said delay means, and comprises means responsive to the presence of said fixed duration signal for storing said average value signal.

9. The combination as set forth in claim 7, wherein said average value producing signal means comprises means for summing said delayed and undelayed alternating signals and means for producing a signal which is a fraction of said summed signal, which is said average value signal.

10. The combination as set forth in claim 9, wherein said means for producing a fraction signal comprises means for producing a signal equal to one-half the summed signal.

11. Apparatus for reading binary encoded information in the form of alternating regions of indicia, exhibiting two different reflectivities representative of binary information comprising, in combination:

optical scanning means producing an alternating signal, the amplitude of which corresponds to the reflectivity of the information being scanned;

means for delaying the alternating signal;

means producing a signal which is a fraction of the sum of the delayed and undelayed alternating signals;

means for storing the fraction signal produced for a fixed time following the trailing edge of each transition in said alternating signal;

means receptive of the delayed signal and stored signal for producing an output signal indicative of which of the two received signals is the greater amplitude.

12. The combination as set forth in claim 11, wherein said binary encoded information is in the form of regions of two basic colors exhibiting substantially two different reflectivities, the dimension of each region along the scan path being an integral multiple of a unit dimension and wherein said optical scanning means includes means for scanning at a fixed rate along said scan path.

13. The combination as set forth in claim 12, wherein said delaying means includes means for delaying said alternating signal a time equal to a fraction of the time required to scan said unit dimension.

14. The combination as set forth in claim 13, wherein said means receptive of said delayed and stored signals includes means for producing a signal at a first level corresponding to a scan of one of said two basic colors when the amplitude of said delayed signal exceeds that of said stored signal and producing a signal at a second level when the reverse conditions are true, the leading edge of each of said levels being delayed from the time of scan across a boundary between said two colors by the amount of delay in said delay means.

15. Apparatus for reading binary indicia in the form of regions of alternating colors exhibiting two substantially different reflectivities comprising, in combination:

optical scanning means producing a signal, the amplitude of which corresponds at any point in time to the reflectivity of the region being scanned, each region along the scan path being greater than a given width;

delay means for delaying said optical scanning signal by an amount which is a fraction of the time required by said scanner to scan said given width;

means producing a signal which is the average of the signals produced by said optical scanning means and the delayed signal therefrom;

means storing said average value signal when it is at a fixed value;

means receptive of the delayed signal and stored signal for producing an output signal, the value of which is indicative of which of the two input signals has the greater amplitude, whereby when the stored signal has the greater amplitude, the value of the output signal corresponds to a scan over a region of one reflectivity, while when the delayed signal has the greater amplitude a scan over a region of the other reflectivity is indicated, the leading edge of each value of the signal being delayed from the time of actual scan by the amount of delay in said delay means.

* * * * *